April 6, 1954

J. H. WERNIG 2,674,487

CLOSURE WEATHER STRIP

Filed Oct. 20, 1950

Inventor
James H. Wernig
By Willits, Helmig & Baillio
Attorneys

Patented Apr. 6, 1954

2,674,487

UNITED STATES PATENT OFFICE 2,674,487

CLOSURE WEATHER STRIP

James H. Wernig, Bloomfield Village, Mich., assignor to General Motors Corporation, Detroit, Mich., a corporation of Delaware Application October 20, 1950, Serial No. 191,247

6 Claims. (Cl. 296—76)

This invention relates to weather stripping and particularly to improved mountings for weather strip.

Although the invention is disclosed in the drawing and described hereinafter with reference to automobile bodies, specifically weather stripping of the rear deck compartment and rear deck lid of an automobile body, it is intended that this be considered as illustrative only as it will be readily apparent that the invention has equal application to any closure member where a weather strip of soft rubber or like material may be used as the sealing means.

Heretofore in mounting such a weather strip between a closure member and its jam member one side of the base or body portion of the weather strip has usually been cemented to one of the members, it being intended that this cementitious attachment will both seal that member to the weather strip and support the weather strip for a resilient lip portion thereof to sealingly abut the other member when the door is closed. In sealing automobile rear deck lids and engine hoods, frequent difficulty is encountered with such weather strip mountings, since generally these deck lids and hoods occupy horizontal or substantially horizontal positions when closed and water tends to collect about the weather strip in normal usage resulting in metal corrosion and deterioration of the rubber to metal bond.

Among the objects of my invention are to provide a weather strip mounting which does not depend for security on the maintenance of a cementitious attachment bond, is of simple design and cheap construction, and utilizes the normal sealing pressure thereon in operation to insure against separation and leakage between the weather strip and its supporting member.

These and other objects and advantages as will hereinafter be apparent are accomplished by providing a weather strip having a body portion threadedly interengaging a supporting member and having a sealing lip portion adapted under sealing pressure in operation to deflect relative to the body portion in a manner tending to thread the body portion farther onto the weather strip supporting member.

In the drawings—

Figure 1:
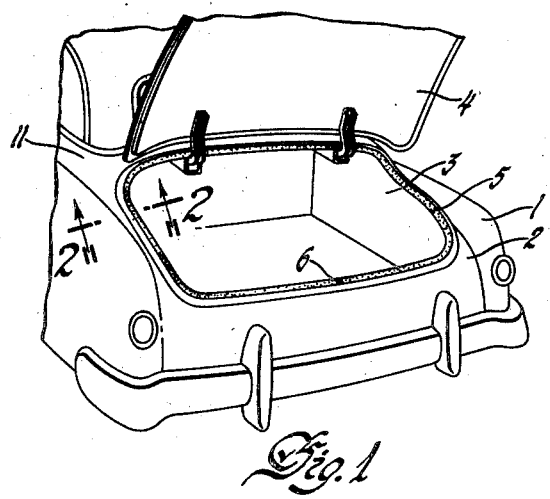
Figure 1 is a perspective view of the rear end of an automobile embodying my improved weather strip and mounting for sealing the rear deck lid.

Referring now in detail to the drawing, there is shown an automobile 1 having a rear deck compartment 2 provided with an opening 3 closable by a hinged lid 4. For sealing the lid 4 in closed position is a weather strip 5 of soft elastically yieldable material such as rubber. This weather strip extends continuously around the perimeter of the opening 3 and may consist of one continuous loop or be formed as a strip, the ends of which abut each other at the joint 6 which is preferably located on the lowermost margin of the opening 3. I have shown the weather strip attached to the fixed member, i. e. the compartment 2, however this should be considered as illustrative only since the weather strip could be attached to the lid 4 where that was desirable.

Figure 2:
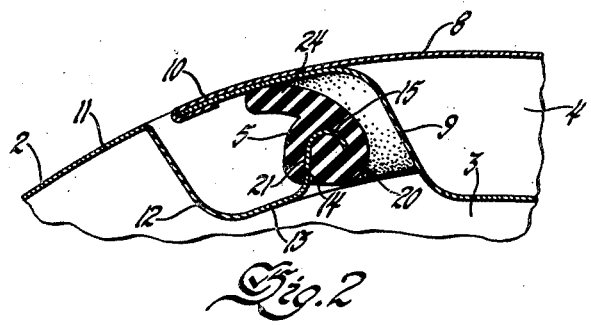
Figure 2 is an enlarged sectional view on line 2—2 of Figure 1, except showing the deck lid in closed position.
Figure 3:
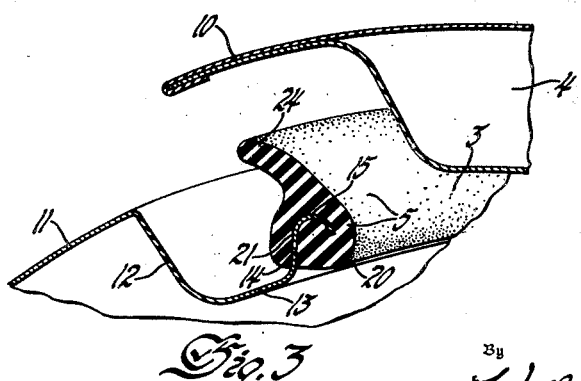
Figure 3 is a view similar to Figure 2 with the deck lid in partially open position.

Referring particularly now to Figures 2 and 3 I have shown the lid 4 as formed of inner and outer sheet metal panels 8 and 9 which are crimped together at their common margin to form an edge portion 10 overlapping or overhanging somewhat the sheet metal walls 11 of the compartment 2 adjacent the opening 3. The walls 11 are provided in conventional manner with an upwardly presenting trough portion 12 adjacent the opening 3 with the trough bottom wall 13 recessed below the edge portion 10 of the deck lid, this trough having the usual function of serving to collect and drain water passing under the marginal edge 10 of the deck lid. The wall 14 of this trough nearest the opening 3 terminates in an arcuate shaped flange 15 turned toward the opening 3 and inwardly of the compartment as shown.

The weather strip 5 comprises a body portion 20 having a groove 21 extending the full length thereof and of arcuate shape in transverse section to conform with the arcuate shaped flange 15. This groove 21 threadedly receives the flange 15 and snugly embraces the opposite faces of this flange. Formed as an integral extension of the body portion 20 is the sealing lip 24, which in its free unrestrained position as shown in Figure 3 projects from the body portion 20 in a direction outwardly of the compartment and away from the opening 3. This lip 24 is thus inclined relative to the body portion 20 and terminates substantially outward of the opening from the body portion 20 where it is engageable by the edge portion 10 of the deck lid when the deck lid is moved from open to closed position.

In operation, as the deck lid approaches its closed position of Figure 2 it first contacts the sealing lip 24, causing this lip to deflect from its position of Figure 2 to its position of Figure 3, with the result that the body portion 20 tends to rotate in a counterclockwise direction. While ordinarily no actual rotation of the body portion 20 occurs (assuming the flange 15 is fully seated in the groove 21) a continuous force exists at all times while the deck lid is closed tending to retain the weather strip securely anchored to the flange 15.

It may be preferable when the weather strip is initially installed to coat the flange 15 with an adhesive cement to insure the weather strip remaining in place when the deck lid is open, particularly if the weather strip is rather stiff and tends to work itself loose during the initial installation. However after a substantial period of use during which the deck lid has remained closed, the weather strip will have taken a permanent set and no further difficulty with its coming loose will be encountered. Even should the weather strip at some time loosen slightly from its fully seated position on the flange, it will be immediately returned to its fully seated position upon closure of the deck lid.

Having now fully disclosed my invention in a specific application to the sealing of an automobile rear deck lid, it is desired to emphasize that the broader aspects of the invention are not to be limited other than as defined by the appended claims.

I claim:

1. The combination with a member forming an opening and a closure member for said opening, of an extension on one of the members overlapping the other member along a margin of the opening when the closure member is in closed position, said extension terminating in a uni-directionally curled section, and a weather strip having a body portion provided with a groove threadedly receiving said curled section and a lip sealingly engageable with and movable by said other member in a direction tending to thread said body portion onto said curled section during closure of said opening.

2. A weather strip of soft resilient rubber-like material for preventing the passage of moisture between a door and its jam when the door is closed, including a body portion for mounting to the jam and an integral lip extending from the body portion for sealingly engaging the door when closed, said body portion having a groove running longitudinally of the weather strip of singularly curved arcuate shape in transverse section for threadedly receiving a correspondingly shaped jam extension, said lip being arranged to bend about said body portion in response to pressure imposed on the outer end of the lip by the door in closing, said bending being in the same direction about said body portion as said body portion would be rotated in threading the body portion onto the jam extension.

3. In a door sealing structure, a door, a member forming an opening closable by the door, said door and member having edge portions overlapping each other when the door is closed, said member edge portion terminating inwardly of the opening in a flange of arcuate section, and a weather strip of soft resilient rubber-like material having a body portion with a groove of single arcuate section threadedly receiving said flange and an extending lip adapted to elastically deflect under pressure there against by the door in closing, said lip in its normal undeflected position being inclined outwardly of the opening whereby its deflection by the door during closing tends to thread said body portion farther onto said flange.

4. In an automobile body structure including walls forming a body compartment with an opening for access to the compartment and a door for closing said opening, said walls forming an outwardly presenting trough about said opening, the sides of said trough adjacent the opening each terminating toward the opening in a single arcuate shaped flange defining its side of the opening, said door when closed having marginal edge portions overhanging said flanges, and a weather strip of soft rubber or equivalent material for effecting a seal between the door and said flanges around the perimeter of said opening when the door is closed, said weather strip having a lengthwise groove of arcuate transverse section snugly receiving each of said flanges and a door engageable lip extending in a direction outwardly of the compartment and away from the opening.

5. In an automotive rear deck structure, walls defining a compartment with an opening, an outwardly presenting trough on said walls surrounding the opening, the side of said trough adjacent the opening terminating in a laterally extending uni-directionally curled flange, a lid for closing said opening having marginal edge portions overhanging said trough when the lid is closed, and a weather strip of soft rubber or the like for sealing the edge portions of the lid to said flange when the lid is closed, said weather strip having a body portion within which said flange is embedded and a lid engageable resilient lip portion extending outwardly from said body portion and laterally thereof in the opposite direction from which said flange extends laterally of said wall.

6. The combination with a member forming an opening and a closure member for said opening, one of said members having an edge along one margin of the opening terminating in a uni-directionally curled section, a weatherstrip having a body portion provided with a groove threadedly receiving said curled section and a lip sealingly engageable with and movable by said other member in a direction tending to thread said body portion onto said curled section during closure of the opening.

References Cited in the file of this patent

UNITED STATES PATENTS

| Number | Name | Date |
|---|---|---|
| 577,239 | Devers | Feb. 16, 1897 |
| 1,592,466 | Morgan | July 13, 1926 |
| 1,818,436 | Stiglitz | Aug. 11, 1931 |
| 2,484,176 | Lindemann | Oct. 11, 1949 |
| 2,528,264 | Coppock et al. | Oct. 31, 1950 |

FOREIGN PATENTS

| Number | Country | Date |
|---|---|---|
| 574,470 | Great Britain | Jan. 7, 1946 |